J. K. BARNEY.
Gage.
No. 24,438.
Patented June 21, 1859.
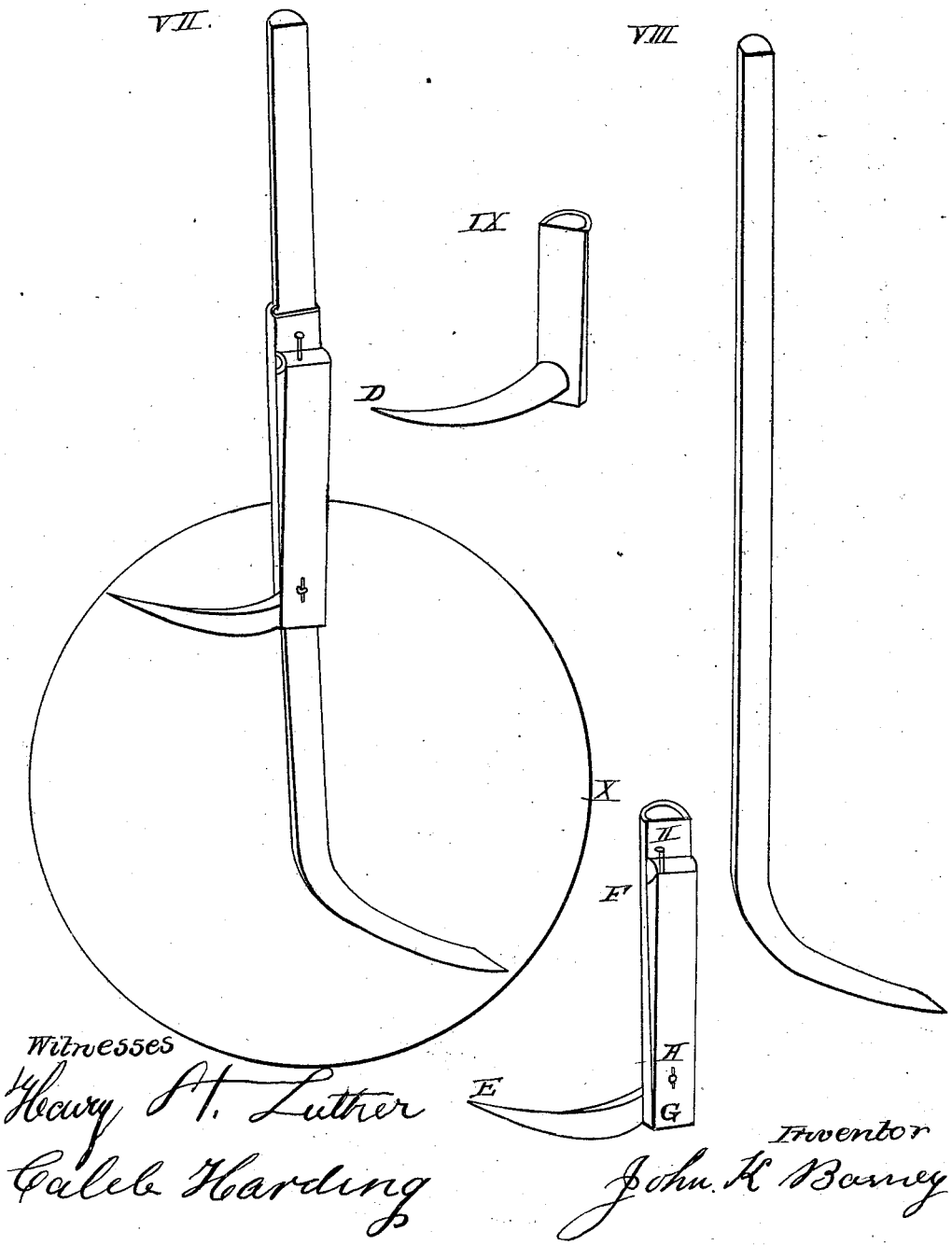
Witnesses
Henry H. Luther
Caleb Harding
Inventor
John K. Barney

UNITED STATES PATENT OFFICE.

JOHN K. BARNEY, OF WARREN, RHODE ISLAND.

INSTRUMENT FOR GAGING CASKS.

Specification of Letters Patent No. 24,438, dated June 21, 1859.

*To all whom it may concern:*

Be it known that I, JOHN K. BARNEY, of Warren, in the county of Bristol, in the State of Rhode Island, have invented a new and useful Machine for Obtaining the Diameter of Casks at the Bung; and I do hereby declare that the following is a full and exact description thereof, reference being had to the accompanying drawings, and to the letters of reference marked thereon, making a part of this specification, in which—

Figure VII, is a view of the instrument when extended in the cask, Fig. VIII, a view of a rod bent diagonally for an arm C, Fig. IX, a view of a slide with a diagonal arm attached D, Fig. X, a view of a slide with a diagonal arm attached E, with a triangular caliper F, and a bracket G, and pins H and I, pin I is fastened to the slide with a string, the other passing through caliper F, to the flat side of the slide, marked X in the drawings, and also through bracket G, fastened to said slide.

The body of the instrument is composed of a rod, marked Fig. VIII, in the drawing—when used in the cask, the inside slide Fig. X is put on to the rod Fig. VIII in the drawing at the end of the rod opposite to arm C, made of the rod, the pin I is removed from the hole in the top of bracket G, so that the lower curved end of the triangular caliper will enter the bung and after passing a sufficient distance to clear the top staves, the other end of said caliper is brought up under bracket G, and the pin I put through the said bracket G, and into the end of said caliper, where there is a hole for that purpose, when the admeasurement is performed, the pin is removed, when the caliper will turn and come out with the rod, when the sediments are too thick for the slide inside, the slide at Fig. IX can be put on to the rod, and the diameter found, with the rod inside, and the slide out, in that case the thickness of the top staves are to be deducted, by reference to the drawings these changes will be readily perceived. On one side of the rod is marked, 16, 17, 18, 19, 20, ¼ inches taken for inches—which figures measure from the points, arm C, and slides Fig. IX or X diagonally.

As it is well known that casks filled and conveyed in vessels get out of shape, either pressed in at the sides, or at the top and bottom making sometimes several inches difference between the diameter horizontally and the diameter perpendicularly, by taking the diameter diagonally this difficulty is overcome.

The instrument is sufficiently stiff to pass through the sediments in any cask.

What I claim as my invention, and desire to secure by Letters Patent, is—

The caliper rod Fig. VIII, the slides IX and X, the triangular caliper, bracket, and pins, as described and their combinations in the instrument, by which the true diameter at the bung of any cask can be obtained however thick the sediments therein may be.

I do not confine myself to the particular manner of fastening the parts in the instrument, but to the principles of the construction of the instrument.

JOHN K. BARNEY.

Witnesses:
ALFRED BOSWORTH,
LUTHER C. SHORT.